Nov. 30, 1926.

C. E. SWENSON

UNIVERSAL JOINT

Filed April 17, 1922

Inventor.
Carl E. Swenson
By Ira J. Wilson, Atty.

Patented Nov. 30, 1926.

1,609,139

UNITED STATES PATENT OFFICE.

CARL E. SWENSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL L. ANDERSON, ALL OF ROCKFORD, ILLINOIS.

UNIVERSAL JOINT.

Application filed April 17, 1922. Serial No. 553,414.

This invention is an improvement of that type of universal joint disclosed in United States Letters Patent No. 1,450,707, which is characterized by trunnion-type coupling members, a transmission housing providing a lubricant reservoir, and bearing blocks for the trunnions disposed in said reservoir and serving for connecting parts of the transmission housing together.
The primary object of the present invention is to improve and simplify the construction, with the view to securing greater practicability, increased efficiency and lower cost of production. These results are obtained mainly by the provision of a novel end thrust bearing for each trunnion, as will be described more fully hereinafter.

Another object is to provide in a universal joint of the character described, that is, including a sectional lubricant housing and trunnions entering and having bearing therein, novel packings between the housing and trunnions, which packings are placed under compression by the act of clamping the housing sections together, thereby preventing loss of oil or other lubricant. I prefer to employ a resilient packing, so that, being under compression its resiliency becomes a factor in maintaining a tight joint over a long period of time. Furthermore, the packings are in the present instance confined on all sides by metal faces and, being protected and preserved against outside deterioration or wearing influences, the effective life of such packings is increased in comparison with exposed packings. The packings being under compression not only prevent leakage of oil but also positively prevent admission of foreign matter to the lubricant reservoir, which also is a factor in promoting greater life to the universal joint.

Referring to the drawing,—

Figure 1:
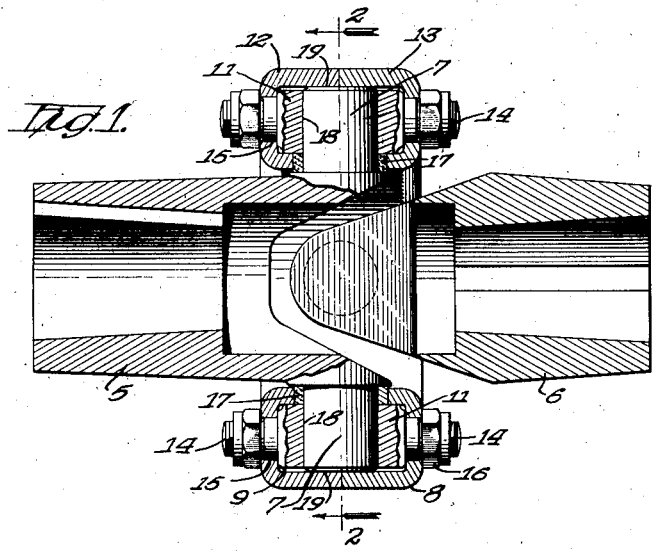
Figure 1 is a longitudinal sectional view through a universal joint embodying my invention.
Figure 2:
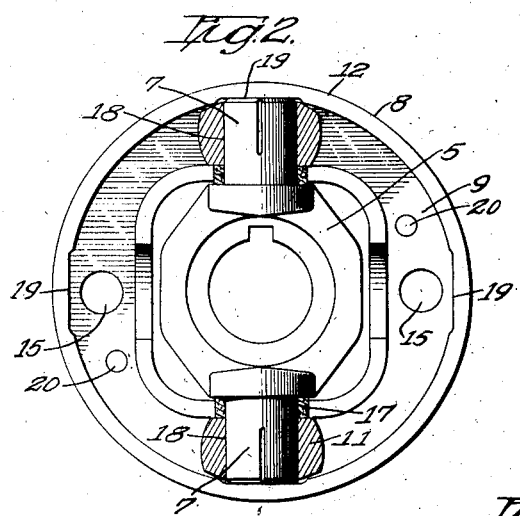
Fig. 2 is a cross-sectional view taken substantially on the line 2—2 of Fig. 1, with the coupling member on the near side and its bearing blocks removed;
Figure 3:
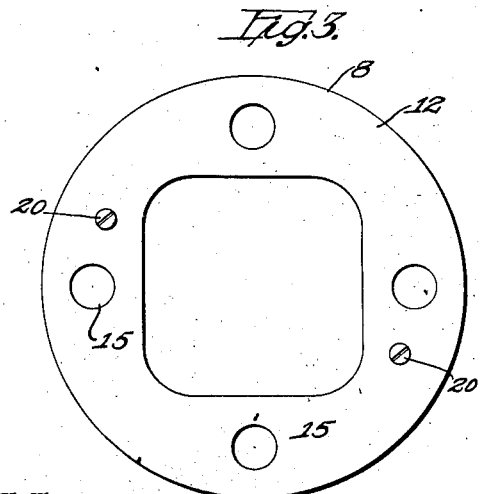
Fig. 3 is a view looking at the closed ends of one of the parts of the transmission member.
Figure 4:
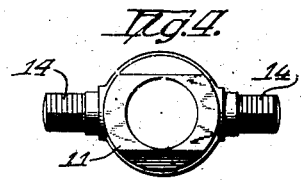
Fig. 4 is a detail view of one of the bearing blocks removed.

The present invention will be readily understood without a detailed description of the construction and advantages of the particular universal joint shown on the drawings. For this, reference may be had to the above mentioned patent. It will suffice to say that the universal joint shown comprises trunnion-type coupling members 5 and 6 of conventional construction having opposed trunnions 7. A transmission member or housing 8 of sectional construction provides a lubricant reservoir 9, and serves through the agency of trunnion bearing blocks, to establish the desired driving connection between the trunnions of the coupling members. Said housing may be of any suitable or preferred construction and at present is in the form of two annular parts 12 and 13, channel-shaped in cross section, clamped together at their open ends. These parts are preferably formed of stamped sheet metal for economy in production. The inturned flanges formed in this way complete the channel cross-section shown. In the present embodiment, the bearing blocks serve as a means for clamping said housing sections together, it being noted that each bearing block has opposed threaded ends 14 extending through holes 15 in the housing sections, and that by means of nuts 16 threadingly engaged on said ends 14, said sections may be rigidly clamped together over upon the interposed bearing blocks. Each trunnion has a radial bearing in one of the bearing blocks and the inner end of each such bearing is sealed by a packing 17.

One phase of my invention consists in securing radial bearing of greater area and more effective end thrust bearings for the trunnions; and I have likewise aimed to provide a more efficient universal joint and to so simplify the construction as to lower the cost of production. To this end, the trunnions 7 are extended entirely through and beyond the ends of the bearing blocks 11, so that radial bearing 18 is provided from the inner to the outer end of each block. Each trunnion has a bearing at its outer end against an inner bearing surface 19 formed on the interior wall of the transmission housing. The wall referred to is formed by the edge to edge abutment of the two outer inturned annular flanges of the parts 12 and 13, in an obvious manner. Thus in universal joints of this type, I am able to increase radial bearing surface without increasing the diametrical dimension of the joint, and I obtain most direct and effective end thrust bearings. By taking the end thrust directly against the transmission housing, there is also less wear and strain on the transmission blocks and less liability of their becoming loosened. Economy in production is promoted by making the end thrust bearings directly on the housing sections either when forming the latter or by separate operation. One of the housing members 12 is preferably provided with lubricating holes normally closed by screw plugs 20.

Another phase of my invention relates to the manner in which the lubricant reservoir is kept oil-tight. It will be observed that the packings or packing washers 17 which embrace the inner ends of the trunnions are confined in cross-section on all four sides of their rectangular section by metal faces. I make the bore of each packing of slightly less diameter than the outer diameter of the trunnion and the outside diameter of the packing greater than the inside diameter of the complemental hole in the housing sections. Also, I employ packings of a resilient material such as composite cork. Consequently when the housing sections are clamped together they will compress the packings so that they exert pressure on all four sides of the rectangular section of the packing and maintain tight joints between the trunnions and lubricant reservoir. Because of the resiliency of the packing material under compression, the joint will be kept tight for an unusually long time under continuous use. The packings are so confined as to be protected from outside deteriorating influences; and because of the tight joint maintained, the packings prevent foreign matter from entering the lubricant reservoir.

From the foregoing it will be seen that the assembly providing radial and thrust bearings for the trunnions is composed of comparatively few parts, and that the lubricant reservoir is so constructed as to retain oil over a long period, thus promoting greater efficiency and longevity in a universal joint of this character.

It should also be noted that my invention is not limited to the particular style of trunnion type universal joint herein disclosed for purpose of illustration, but is applicable to any style of joint employing trunnion connectors.

It is believed that the foregoing conveys a clear understanding of the objects prefaced above, and while I have illustrated but a single working embodiment it should be understood that various changes might be made in the construction and arrangement without departing from the spirit and scope of the invention as expressed in the appended claims, in which—

I claim:—

1. A universal joint comprising trunnion-type coupling members, a sectional transmission housing, and bearing blocks for the trunnions disposed between the sections of said housing and serving to connect said sections together, the inner surface of said housing serving as an end thrust bearing for the outer end of each trunnion.

2. A universal joint comprising trunnion-type coupling members, a sectional transmission member providing a lubricant reservoir, and bearing blocks within said transmission member providing lateral bearing for the trunnions and serving to hold the transmission member sections together, the outer end of each trunnion bearing directly against an inner surface of said transmission member.

3. A universal joint comprising trunnion-type coupling members, a transmission housing formed of two annular sections having inturned flanges extending toward one another to form a peripheral wall and to jointly provide a lubricant reservoir, bearing blocks for said trunnions disposed within said reservoir, and means for clamping said housing sections to the interposed bearing blocks, the trunnion ends bearing directly against the inside of said peripheral wall.

4. A universal joint comprising trunnion type coupling members, a transmission member intermediate the same composed of two annular sections, one of which sections has an inturned flange extending toward the other section to form a peripheral wall, bearing blocks for said trunnions between the sections of said transmission member, the ends of said trunnions bearing against the inside of said peripheral wall, and means to secure the sections of said transmission member together with the bearing blocks held therebetween.

5. A universal joint comprising trunnion type coupling members, a transmission ring intermediate the same composed of two sections, struck from sheet metal to provide quarteringly spaced places for the reception of trunnion bearing blocks, one of said sections having an inturned flange at the outer edge thereof extending toward the other section to provide a peripheral wall at each of said trunnion places, bearing blocks for said trunnions mounted between said sections in the places therefor, the ends of said trunnions bearing against said peripheral wall for end thrust, and means to secure the sections of said transmission ring together with the bearing blocks held therebetween.

6. A universal joint comprising trunnion type coupling members, a transmission member intermediate the same composed of two annular sections, one of said sections having an inturned flange extending toward the other section to provide a peripheral wall, bearing blocks between said sections having bearing openings therein to receive said trunnions for lateral bearing, the outer ends of said trunnions projecting beyond the outer ends of said bearing blocks and bearing against the inside of said peripheral wall for end thrust, and means for securing the sections of said transmission member together with the bearing blocks held therebetween.

7. A universal joint comprising trunnion type coupling members, a transmission ring therebetween composed of two sections struck from sheet metal to provide quarteringly spaced places for the reception of trunnion bearing blocks, one of said sections having an inturned flange struck therefrom at the outer edge thereof extending toward the other section to provide a peripheral wall at each of said trunnion places, bearing blocks between said sections having bearing openings therein to receive said trunnions for lateral bearing, the outer ends of said trunnions projecting beyond the outer ends of said bearing blocks and bearing against the inside of said peripheral wall for end thrust, and means for securing the sections of said ring together with the bearing blocks held therebetween.

8. A universal joint comprising trunnion type coupling members, a transmission member intermediate the same composed of two annular sections each provided with inner and outer flanges, said sections being arranged with their inner flanges and their outer flanges respectively in abutting relation to provide a ring-shaped hollow transmission member to contain a supply of lubricant, quarteringly spaced openings provided in the inner peripheral wall of said transmission member to receive the trunnions of said coupling members, and bearing surfaces adjacent said openings on the inside of the outer peripheral wall of said transmission member, bearing blocks in said transmission member at said quarteringly spaced openings, the trunnions of said coupling members extending through said openings to fit in bearings in said blocks and projecting through said blocks to the adjacent bearing surface within said transmission member whereby the end thrust of said trunnions is resisted, and means for securing the sections of said transmission member together with the bearing blocks held in position therebetween.

9. A universal joint as set forth in claim 8 wherein the outer ends of said trunnions extend beyond the outer ends of said bearing blocks leaving a space between the blocks and the outer peripheral wall of said transmission member for the passage of lubricant to said trunnions.

10. In a trunnion type universal joint, the combination with terminal coupling members and a transmission member adapted to be connected by trunnion connections, each connection including a trunnion, a bearing therefor and separable parts for holding the bearing in position, means for lubricating the bearings, and a packing of solid, impervious, and resilient material around each trunnion, rectangular in cross-section, confined on all sides by adjacent parts including said separable parts, and being compressed by such separable parts so as to exert pressure on all sides for maintaining a tight joint.

11. A trunnion type universal joint as set forth in claim 10, in which the packings are of composite cork.

CARL E. SWENSON.